United States Patent
Watterson et al.

(10) Patent No.: US 9,142,139 B2
(45) Date of Patent: Sep. 22, 2015

(54) STIMULATING LEARNING THROUGH EXERCISE

(71) Applicant: ICON Health & Fitness, Inc., Logan, UT (US)

(72) Inventors: Scott R. Watterson, Logan, UT (US); Mark D. Watterson, Logan, UT (US); David Watterson, Logan, UT (US)

(73) Assignee: ICON Health& Fitness, Inc., Logan, UT (US)

( * ) Notice: Subject to any disclaimer, the term of this patent is extended or adjusted under 35 U.S.C. 154(b) by 190 days.

(21) Appl. No.: 13/872,882

(22) Filed: Apr. 29, 2013

(65) Prior Publication Data

US 2013/0288223 A1 Oct. 31, 2013

Related U.S. Application Data

(60) Provisional application No. 61/640,452, filed on Apr. 30, 2012.

(51) Int. Cl.
*G09B 19/00* (2006.01)
*G09B 5/06* (2006.01)
*G09B 7/00* (2006.01)

(52) U.S. Cl.
CPC *G09B 19/00* (2013.01); *G09B 5/06* (2013.01); *G09B 7/00* (2013.01)

(58) Field of Classification Search
CPC .................................................. G09B 19/0038
USPC ........................................ 434/428, 247, 236
See application file for complete search history.

(56) References Cited

U.S. PATENT DOCUMENTS

| | | | |
|---|---|---|---|
| 2002/0106617 A1* | 8/2002 | Hersh | 434/236 |
| 2005/0240444 A1* | 10/2005 | Wooten et al. | 705/3 |
| 2011/0087137 A1* | 4/2011 | Hanoun | 600/587 |
| 2012/0237911 A1* | 9/2012 | Watterson | 434/247 |
| 2014/0335490 A1* | 11/2014 | Baarman et al. | 434/236 |

OTHER PUBLICATIONS

Cotman, et al., Exercise: a behavioral intervention to enhance brain health and plasticity, TRENDS in Neurosciences, 295-301, vol. 25, No. 6, Jun. 2002 (7 pp.).

\* cited by examiner

*Primary Examiner* — Kesha Frisby
(74) *Attorney, Agent, or Firm* — Holland & Hart LLP

(57) ABSTRACT

An exercise system stimulates the learning and memory of a user by detecting a stress level of the user with one or more biometric sensor devices, determining that the user's stress level is within a stress zone that is suitable for memory retention by the user, and presenting educational content to the user at one or more output devices.

20 Claims, 4 Drawing Sheets

STIMULATING LEARNING THROUGH EXERCISE

CROSS-REFERENCE TO RELATED APPLICATION

This application claims priority to U.S. Provisional Patent Application No. 61/640,452 filed Apr. 30, 2012.

TECHNICAL FIELD

This disclosure relates generally to systems, methods, and computer program products for exercise and learning. More particularly, the disclosure relates to systems, methods, and computer program products for using exercise to stimulate learning and memory retention.

BACKGROUND

Physical exercise benefits the general health of the human body. For example, physical exercise can bring about enhanced muscle tone, decreased body fat, increased cardiovascular health, increased mental health, reduction of the effects of stress, etc. In addition, physical exercise may bring about increased cognitive abilities, including an increased ability of the brain to form and retain memories. For example, research has shown that physical exercise can increase the production of some neurotrophic factors, or proteins that are capable of signaling neurons to survive, to differentiate, to grow, etc. (see, e.g., "Exercise: a behavioral intervention to enhance brain health and plasticity" by Cotman and Berchtold, Trends in Neuroscience, 2002). In particular, Cotman finds that rats or mice that participate in voluntary "wheel running" produce increased levels of brain-derived neurotrophic factor (BDNF) (among other proteins) in their hippocampus. BDNF has been found to be an important neurotrophic factor for developing long-term memory, and the hippocampus is normally associated with higher cognitive function, such as learning and memory. As such, physical exercise, which induces the production of BDNF and other proteins, may also enhance learning, including the ability to record and retain memories.

SUMMARY OF THE INVENTION

In one example embodiment of the disclosure, an exercise computer system includes one or more processors, one or more biometric sensor devices, one or more output devices, and one or more computer-readable storage media. The computer-readable storage media store computer-executable instructions that, when executed by the one or more processors, cause the exercise computer system to stimulate learning of a user. Stimulating learning of the user includes detecting a stress level of the user at the one or more biometric sensor devices. Stimulating learning of the user also includes, based on detecting the user's stress level, determining that the user's stress level is within a stress zone that is suitable for memory retention by the user. Based on determining that the user's stress level is within the stress zone, stimulating learning of the user includes presenting educational content to the user at the one or more output devices.

In another aspect that may be combined with any of the aspects herein, one or more output devices of an exercise computer system comprise a display device.

In another aspect that may be combined with any of the aspects herein, presenting educational content to a user comprises presenting educational content at a display device.

In another aspect that may be combined with any of the aspects herein, presenting educational content comprises presenting a simulated navigational path having a variable grade at a display device.

In another aspect that may be combined with any of the aspects herein, an incline level of a stationary exercise device is controlled to simulate a variable grade of a simulated navigational path.

In another aspect that may be combined with any of the aspects herein, presenting educational content comprises presenting a simulated traversal of a navigational path at varying speeds at a display device.

In another aspect that may be combined with any of the aspects herein, a speed level of a stationary exercise device is controlled to simulate varying speeds of a simulated navigational path.

In another aspect that may be combined with any of the aspects herein, presenting educational comprises presenting a simulated navigational path having varying difficulty, including one or more of varying speed or varying incline, at a display device.

In another aspect that may be combined with any of the aspects herein, a resistance level of a stationary exercise device is controlled to simulate varying difficulty of a simulated navigational path.

In another aspect that may be combined with any of the aspects herein, one or more output devices of an exercise computer system comprise an audio output device.

In another aspect that may be combined with any of the aspects herein, presenting educational content to a user comprises presenting educational content at an audio output device.

In another aspect that may be combined with any of the aspects herein, detecting a stress level of a user comprises detecting one or more of pulse rate, blood pressure, respiratory rate, body temperature, blood oxygen level, or metabolic rate.

In another aspect that may be combined with any of the aspects herein, detecting the stress level of a user comprises detecting one or more of speed, power generation, incline/grade being traversed, resistance of a workout device, or cadence.

In another aspect that may be combined with any of the aspects herein, detecting a stress level of a user comprises detecting the user's average pulse rate, averaged over a predefined period of time.

In another aspect that may be combined with any of the aspects herein, based on detecting a user's stress level, it is determined that the user's stress level is not within a stress zone that is suitable for memory retention.

In another aspect that may be combined with any of the aspects herein, a workout program is modified to encourage a user to modify the user's level of physical exertion to bring the user's stress level within a stress zone that is suitable for memory retention.

In another aspect that may be combined with any of the aspects herein, modifying a workout program to encourage a user to modify the user's level of physical exertion includes modifying the workout program to encourage the user to increase the user's level of physical exertion.

In another aspect that may be combined with any of the aspects herein, modifying a workout program to encourage a user to modify the user's level of physical exertion includes modifying the workout program to encourage the user to decrease the user's level of physical exertion.

In another aspect that may be combined with any of the aspects herein, modifying a workout program includes modifying one or more parameters of a stationary exercise device.

In another aspect that may be combined with any of the aspects herein, modifying a workout program includes modifying a workout program that is being presented to a user by a mobile exercise device.

In another aspect that may be combined with any of the aspects herein, detecting a user's stress level comprises detecting a pulse rate of the user.

In another aspect that may be combined with any of the aspects herein, determining that a user's stress level is within a stress zone comprises determining that the user's pulse rate is within a predefined range.

In another aspect that may be combined with any of the aspects herein, a method for stimulating learning and memory retention includes detecting a stress level of a user at one or more biometric sensor devices, including detecting at least a pulse rate of the user.

In another aspect that may be combined with any of the aspects herein, a method for stimulating learning and memory retention includes determining that the user's stress level is within a stress zone that is suitable for memory retention by the user based on detecting a user's stress level, including determining that the user's pulse rate is within a predefined range.

In another aspect that may be combined with any of the aspects herein, a method for stimulating learning and memory retention includes presenting educational content to the user at one or more output devices based on determining that a user's stress level is within the stress zone.

In another aspect that may be combined with any of the aspects herein, a method for stimulating learning and memory retention includes modifying one or more parameters of an exercise device to simulate a user traversing a path corresponding to educational content that is being presented to the user.

In another aspect that may be combined with any of the aspects herein, presenting educational content to a user at one or more output devices comprises presenting educational content at a display device.

In another aspect that may be combined with any of the aspects herein, presenting educational content to a user at one or more output devices comprises presenting educational content at an audio device.

In another aspect that may be combined with any of the aspects herein, computer-executable instructions include computer-executable instructions that, when executed by one or more processors of a computer system, cause the computer system to detect a stress level of a user at one or more biometric sensor devices, including detecting at least a pulse rate of the user.

In another aspect that may be combined with any of the aspects herein, computer-executable instructions include computer-executable instructions that, when executed by one or more processors of a computer system, cause the computer system to determine that a user's stress level is within a stress zone that is suitable for memory retention by the user, including determining that the user's pulse rate is within a predefined range, based on detecting the user's stress level.

In another aspect that may be combined with any of the aspects herein, computer-executable instructions include computer-executable instructions that, when executed by one or more processors of a computer system, cause the computer system to present educational content to a user at one or more output devices based on determining that the user's stress level is within the stress zone.

DETAILED DESCRIPTION

As used in this description and in the appended claims, the term "stress" means physical stress that is associated with physical exercise or other physical exertion by a human user. Stress level may be measured by monitoring one or more physiological parameters of the user, such as any combination of pulse rate, blood pressure, respiratory rate, body temperature, blood oxygen level, metabolic rate, etc. In addition, stress level may be measured by monitoring physical exercise performance of the user, such as any combination of speed, power generation, incline/grade being traversed, resistance of a workout device, cadence, etc.

Figure 1:
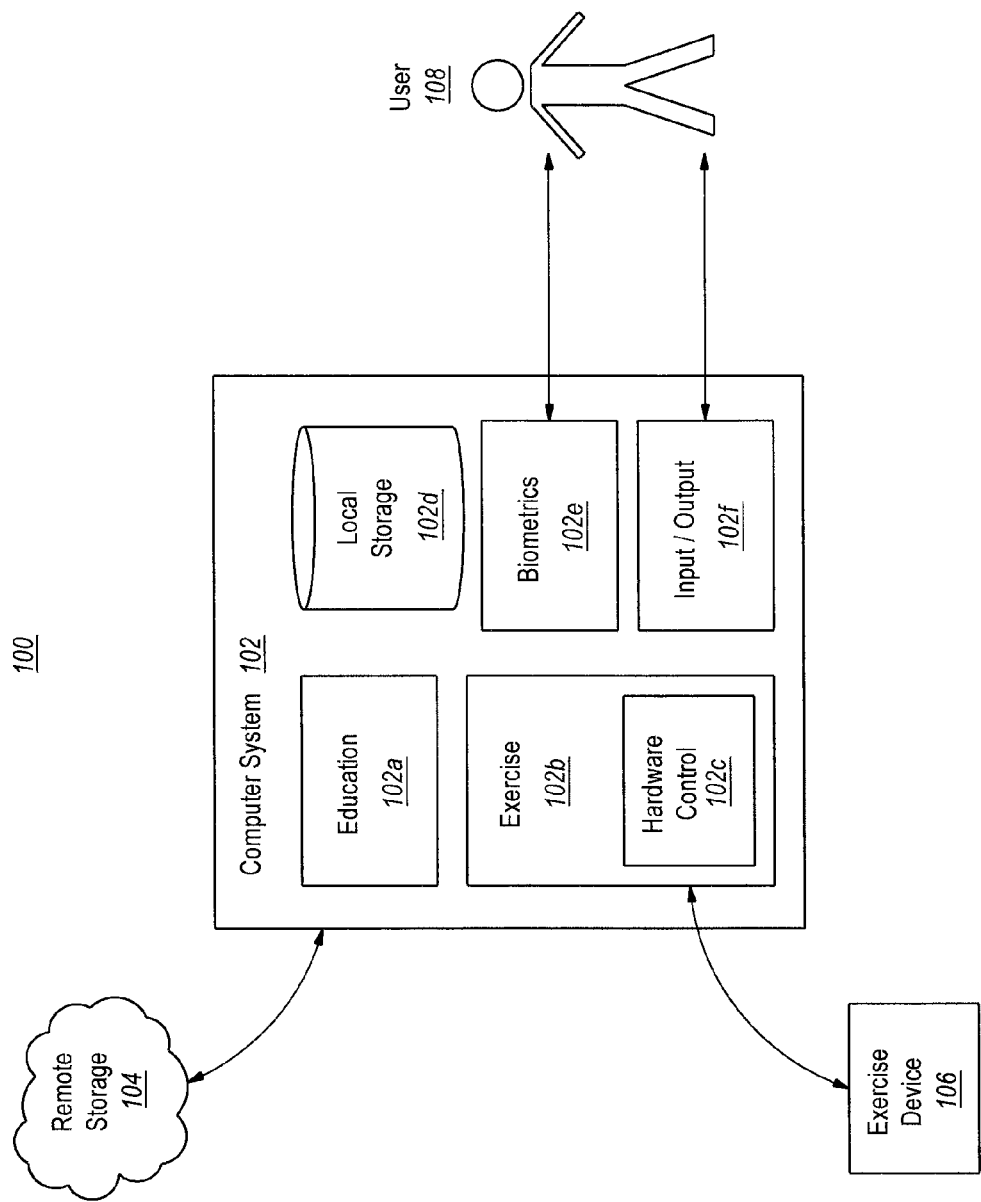
FIG. 1 illustrates a computer architecture for stimulating learning and memory during exercise according to one example embodiment of the present disclosure.

This disclosure relates generally to systems, methods, and computer program products for health and exercise. Depicted in FIG. 1 is a computer architecture 100, which is configured to stimulate learning and memory by presenting educational content to a user concurrent with physical exercise by the user. Computer architecture 100 incorporates novel functionalities, software modules, and the like. Computer architecture 100 may be included as part of a stationary exercise system (e.g., a treadmill, an elliptical trainer, a spinning cycle, etc.), or may be part of a mobile device (e.g., a cycle computer, a heart rate monitor, a GPS device, a mobile telephone, a portable media device, etc.). As depicted, computer architecture 100 includes computer system 102 (including a plurality of components of computer system 102), which is used by user 108. In addition, computer architecture 100 may include remote storage 104 (e.g., a cloud-based storage service) and exercise device 106.

Exercise device 106 can comprise any stationary or non-stationary exercise device that can be used in connection with the disclosure herein. In some embodiments, exercise device 106 comprises a treadmill or a bicycle, such as the treadmill or the stationary exercise cycle disclosed in U.S. Ser. No. 13/422,807, which application is incorporated by reference herein in its entirety. Other exercise devices may include elliptical trainers, stair-stepping machines, outdoor bicycles, and the like. More particular examples of a treadmill and a stationary bicycle that may be used in connection with the present disclosure are discussed later in connection with FIGS. 3 and 4.

Computer system 102 is configured to monitor a stress level of user 108 and to present educational content to user 102 when computer system 102 determines that user 108 has reached a "learning stress zone." As used herein, the phrase "learning stress zone" means a physical stress zone or level at which user 108 likely has an increased ability to learn and form/retain memories. For example, the learning stress zone may correspond to a level of physical exertion at which user 108 is likely to be producing increased levels of BDNF or other neurotrophic factors. As discussed, BDNF and other neurotrophic factors are believed to enhance cognitive ability and the ability of form and retain memories. Computer system 102 includes a plurality of components, such as physical devices and/or software modules.

As depicted, for example, computer system 102 may include the depicted education component 102a, exercise component 102b (including hardware control component 102c for controlling or gathering status data from exercise device 106), local storage 102d, biometrics component 102e, and input/output component 102f. One of ordinary skill in the computer-related arts will recognize that computer system 102 may include a greater number of components or a smaller number of components to accomplish the functionality described herein. Furthermore, one of ordinary skill in the computer-related arts will recognize that components of computer system 102 may be embodied at a single computer system, or may be distributed across a plurality of physically distinct computer systems.

Education component 102a is configured to manage the presentation of educational content to user 108 while user 108 is exercising. For example, education component 102 is configured to monitor a stress level of user 108, and to present educational content to user 108 when user 108 has reached a learning stress zone or level. Education component 102a may be configured to present educational content that is stored on remote storage 104 and/or that is stored on local storage 102d.

With brief reference to local storage 102d and remote storage 104, local storage 102d can include any appropriate computer-readable storage media that is locally accessed by computer system 102. In some embodiments, local storage 102d can include storage media that is configured to be permanently affixed to computer system 102 (e.g., system memory, a local mass-storage device, etc.). Additionally or alternatively, local storage 102d may include removable storage media such as a storage media provided by user 108 (e.g., a storage card or stick that is provided to computer system 102). As such, local storage 102d may include educational content provided by a manufacturer of computer system 102 or by a party under control of computer system 102. Additionally or alternatively, local storage 102d may include educational content provided by user 108 using a portable storage device. Remote storage 104 can include any data storage service or device that is remote from computer system 102, such as a cloud-based web service, a storage media that is wirelessly connected to computer system 102, etc. Local storage 102d and remote storage 104 can store any appropriate data, such as educational content, educational logs, workout programs, workout logs, etc. As such, local storage 102d and remote storage 104 can store data applicable to a plurality of components of computer system 102.

Returning to education component 102a, education component 102a may be configured to use biometrics component 102e to gather physiological information from user 108, such as pulse rate, blood oxygen level, etc. As such, biometrics component 102e can include any appropriate sensor devices or interfaces (e.g., ECG sensor/receiver, blood oxygen sensor/receiver, etc.) that are configured to gather biometric information from user 108. In this context, education component 102a may be configured to determine a stress level of user 108 based on biometric data. For example, education component 102a may determine that user 108 is in a learning stress zone when the user's pulse level is above a defined threshold (e.g., above about 120 BPM) or when the user's pulse level is within a defined zone (e.g., between about 110 BPM and 150 BPM). Of course, other pulse rate thresholds/zones may be used, and analogous thresholds/zones may be defined for other types of biometric parameters.

In some embodiments, education component 102a develops a stress score based on a variety of factors (e.g., based on a plurality of biometric measurements and/or other measurements) and ascertains the user's stress level based on the stress score. In some embodiments, education component 102a is configured to determine whether user 108 is in a learning stress zone based on current biometric information (e.g., current pulse rate). In other embodiments, education component is configured to determine whether user 108 is in a learning stress zone based on averaged biometric information (e.g., average pulse rate over an entire workout or over a defined period of time (e.g., the last five minutes).

Additionally or alternatively, education component 102a may be configured to use exercise component 102b to gather exercise performance data from exercise device 106, such as speed, cadence, power generation, etc. In particular, exercise component 102b can be configured to guide user 108 through a workout program (such as a workout program stored on local storage 102d and/or remote storage 104) and/or to monitor the user's physical performance on exercise device 106. For example, exercise component 102b can include hardware control component 102c, which interfaces with exercise device 106. Hardware control component 102c can send control signals to exercise device 106 to adjust operating parameters of exercise device 106 (e.g., speed, incline/grade, resistance). Hardware control component 102c can also receive status information from exercise device 106 (e.g., speed, incline/grade, resistance, cadence, etc.).

Thus, through hardware control 102c, education component 102a can be enabled to gather status information from exercise device 106. Education component 102a may then be configured to determine that user 108 is in a learning stress zone based on the user's performance level while using exercise device 106. For example, education component 102a may determine that user 108 is in a learning stress zone when the user's performance is above a defined threshold (e.g., running speed above about 5 MPH, cadence above 90 RPM, etc.). Education component 102a may also determine that user 108 is in a learning stress zone when the user's performance is within a defined zone (e.g., running speed between about 4 MPH and about 7 MPH, cadence between about 80 RPM and about 110 RPM). Of course, other performance thresholds/zones may be used. In addition, similar to use of biometric data, education component 102a may be configured to work on current performance data and/or averaged performance data.

In some embodiments, education component 102a is configured to make use of both biometric data and workout performance data to determine when the stress level of user 108 corresponds to a learning stress zone. For example, education component 102a may be configured to detect that user 108 is performing at a particular speed (or speed range) and that, in addition, user 108 has a particular pulse rate (or pulse rate range). In some embodiments, education component 102a develops custom threshold/ranges for learning stress zones for different users. For example, education component 102a can receive information (e.g., age, weight, height, fitness level) about user 108 through input/output component 102f, or can learn fitness-related information about user 108 as user 108 uses computer system 102.

When presenting educational content to user 108, education component 102a can utilize input/output component 102f to present various forms of content to user 108. For example, input/output component 102f can include one or more output devices, such as such as one or more display devices, one or more audio devices, etc. Additionally or alternatively, input/output component 102f may include one or more interfaces to output devices, such as display and/or audio device(s) at exercise device 106. Thus, when presenting educational content to user 108, education component 102a can be configured to present visual content at one or more display devices and/or to present audible content at one or more audio devices.

Furthermore, education component 102a can be configured to receive user input from user 108 (e.g., feedback or instructions), which relates to the educational content that is being presented to user 108. For example, to further reinforce the educational content being presented, education component 102a may pose questions to user 108 and/or enable user 108 to interact with the educational content in any appropriate manner. For example, input/output component 102f can include any combination of keys, buttons, microphones, touch pads, etc. that would enable user 108 to provide user input during presentation of educational content.

Still further, education component 102a can be configured to provide an immersive educational experience through virtual reality or simulation. For example, education component 102a can be configured to use exercise component 102b, and more specifically hardware control component 102c, to change operating parameters of exercise device 106 during presentation of educational content. For example, the educational content may include display content that presents a path that is being traversed virtually by user 108, such as a walk through a historical site. As terrain of the path changes, education component 102a can send commands to exercise device 106 through hardware control 102c to change operating parameters of exercise device 106 (e.g., speed, grade/incline, resistance, etc.), thereby simulating traversal over the changing terrain. For example, variable grades in terrain may be simulated by variable grades produced by exercise device 106, variable speeds of traversal of the terrain may be simulated by changing speeds of exercise device 106, or other characteristics of the terrain may be simulated in any appropriate manner (e.g., varying resistance).

In addition, education component 102a can be configured to ensure that user 108 maintains a stress level that is within the learning stress zone. For example, education component 102a can be configured to constantly, or at least periodically, monitor the user's stress level and to encourage the user to return to the learning stress zone when the user deviates from it. For example, education component 102a may instruct exercise component 102b to increase or decrease the difficulty of the workout being produced by exercise device 106, or to inform user 108 to modify his or her level of exertion (e.g., through a visible or audible message). For example, if user 108 has dropped below a pulse rate and/or speed threshold, exercise component 102b may increase the speed of exercise device 106 or instruct user 108 to increase his or her speed. Conversely, if user 108 has exceeded a pulse rate and/or speed zone, exercise component 102b may decrease the speed of exercise device 106 or instruct user 108 to decrease his or her speed.

Figure 2:
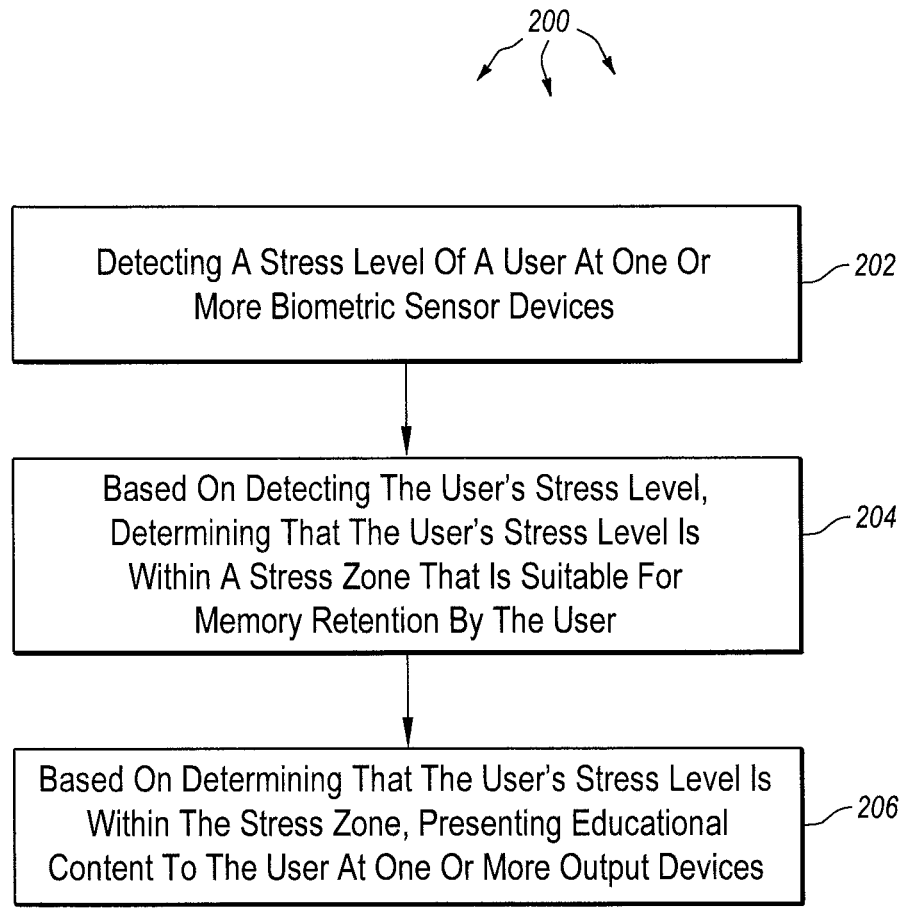
FIG. 2 illustrates a flowchart of an example method for stimulating learning and memory according to one example embodiment of the present disclosure.

Embodiments of the present disclosure may be described in the context of acts in computer-implemented methods. FIG. 2, for example, illustrates a flow chart of an example method 200 for stimulating learning and memory. Method 200 will be described with respect to the components and data of computer architecture 100.

Method 200 includes an act of detecting a stress level of a user at one or more biometric sensor devices (act 202). For example, education component 102a can gather biometric information for user 108 through biometrics component 102e. Biometrics component 102e may include devices or interfaces for gathering physiological information such as pulse rate, blood pressure, blood oxygen level, etc. From this data, education component 102a can ascertain a stress level of user 108. The stress level may correlate to the gathered biometric data, or may be scored based on a variety of factors. Act 202 can also include gathering information about workout performance for user 108, such as information gathered from exercise device 106 (e.g., speed, grade/incline, power generation, cadence, etc.). As such, act 202 may, in some embodiments, include determining the user's stress level based on workout performance data, on biometric data, or on both.

Method 200 also includes, based on detecting the user's stress level, an act of determining that the user's stress level is within a stress zone that is suitable for memory retention by the user (act 204). For example, education component 102a can compare the stress level identified in act 202 with one or more measures of stress zones. For example, if the stress level is scored based on a variety of factors, the stress level may be within a learning stress zone when the score meets a predefined threshold or is within a range of scores. In another example, if the stress level is based on a single biometric factor (e.g., heart rate), the stress level may be within a learning stress zone when the factor meets a predefined threshold or is within a range of scores (e.g., at least 120 BPM or between 110 BPM and 150 BPM).

Method 200 also includes, based on determining that the user's stress level is within the stress zone, an act of presenting educational content to the user at one or more output devices (act 206). For example, education component 102a can present educational content to user 108 using input/output component 102f (e.g., a display device, an audio device, etc.). As discussed, presenting educational content can include receiving user input to immerse user 108 in the educational content, thereby reinforcing what user 108 is learning. For example, education component 102a can quiz user 108, or provide a rich interactive experience. In addition, education component 102a may use exercise device 106 to provide a simulated experience that also immerses user 108 in the educational content while enhancing the user's workout.

Figure 3:
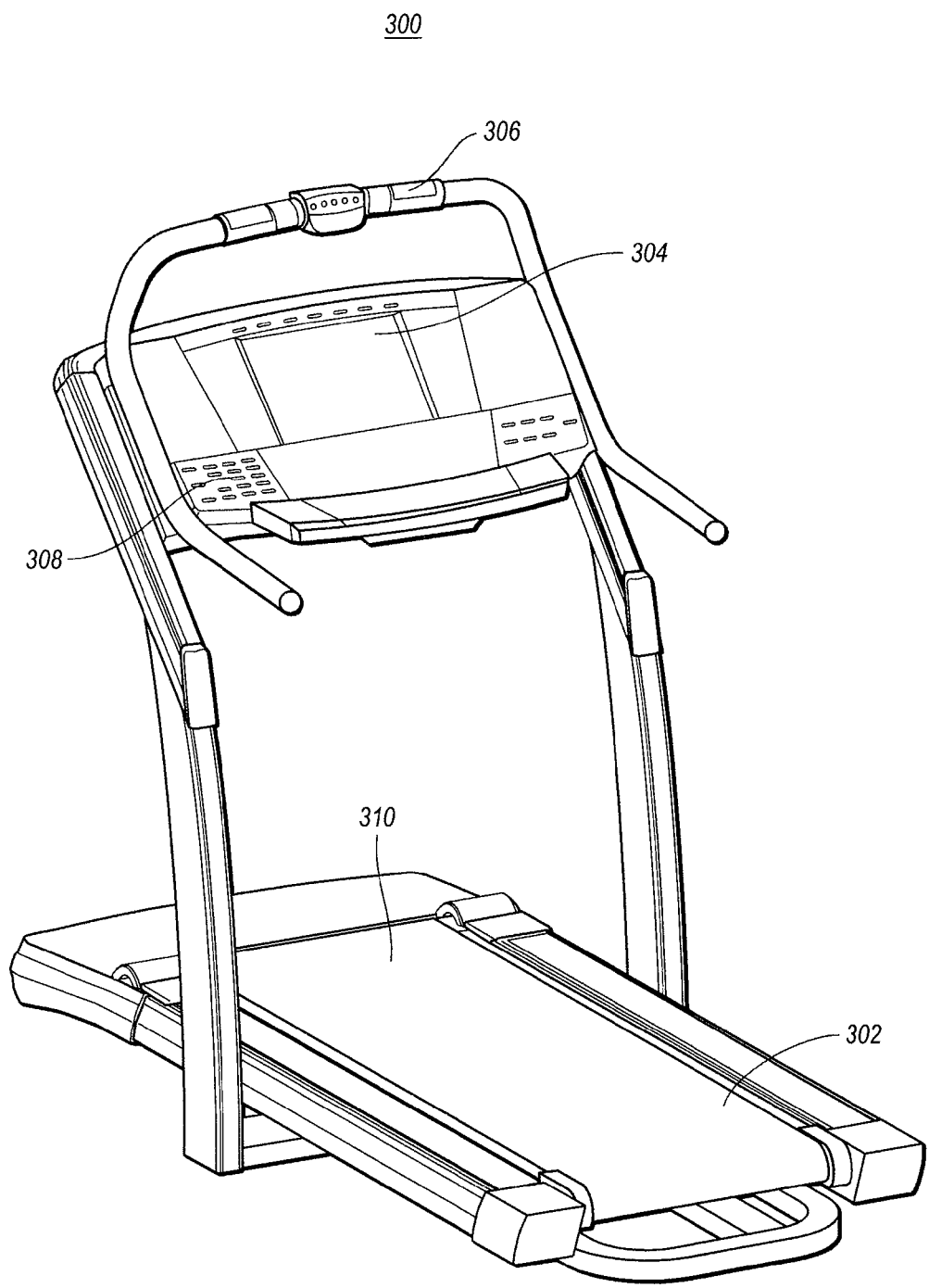
FIG. 3 illustrates a treadmill exercise device according to one example embodiment of the present disclosure.
Figure 4:
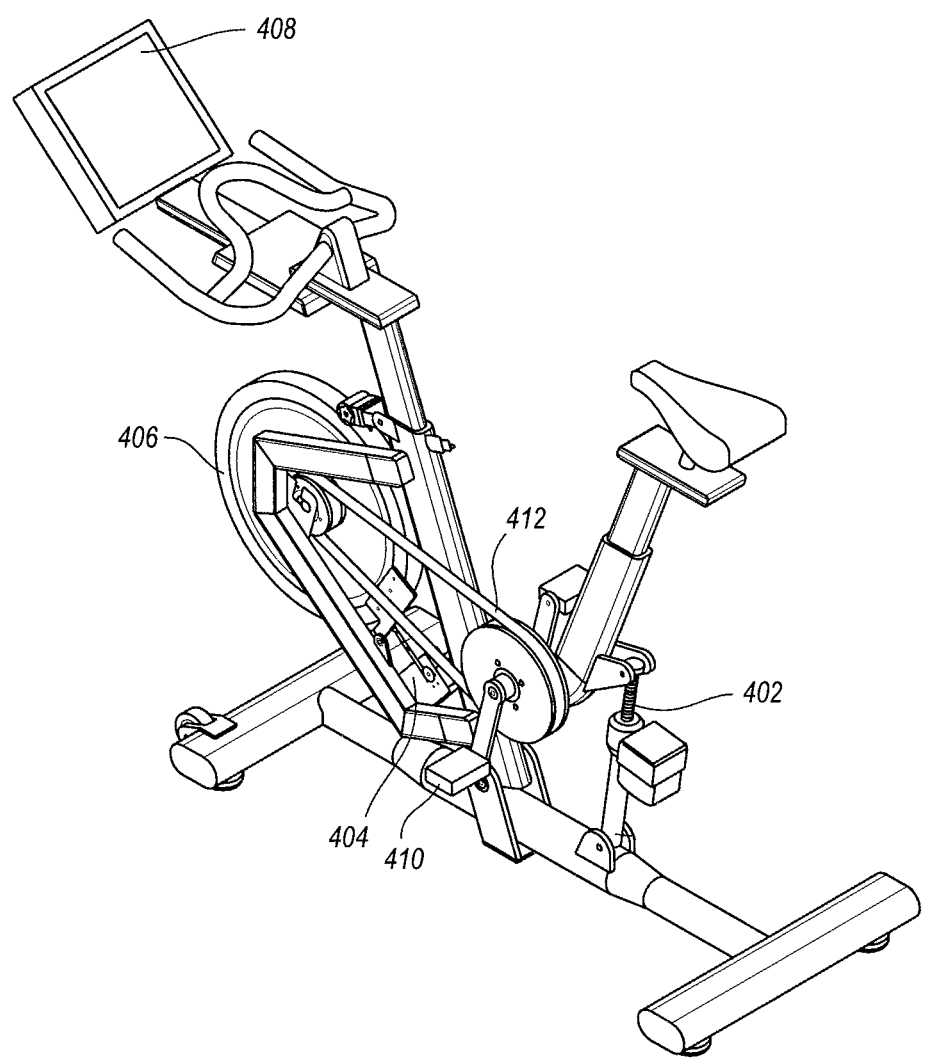
FIG. 4 illustrates a bicycle exercise device according to one example embodiment of the present disclosure.

Following is a more particular description of some exercise devices and educational experiences that may be used with and enabled by the present disclosure. Turning to exercise devices, for example, FIG. 3 illustrates a treadmill 300 exercise device and FIG. 4 illustrates a bicycle 400 exercise device.

With reference to treadmill 300, treadmill 300 can include treadbase 302 and belt 310. Treadmill 300 can cause rotation of belt 310 about treadbase 302, thereby creating a movable surface on which user 108 can walk or run. Treadbase 302 can be configured to be movable, such as to alter the incline/grade of treadbase 302 and/or the side-to-side tilt of treadbase 302. When treadmill 300 is connected to computer system 102, hardware control 102c can send control signals to treadmill 300, instructing treadmill 300 to alter the speed of belt 310, or the incline/tilt of treadbase 302. Treadmill 300 can include display 304 for presenting educational content, tactile input device 308 for receiving user input, and biometric sensor 306 for detecting pulse rate. These devices can interface with input/output component 102f and biometrics component 102e. Treadmill 300 can include any other appropriate devices, such as one or more audio devices (e.g., speakers), one or more microphones, etc.

Turning to bicycle 400, bicycle 400 can include pedals 410 which, when rotated, cause belt 412 to turn flywheel 406. Flywheel 406 can generate resistance on pedals 410, and the resistance can be selectively modified by braking mechanism 404 which is configured to apply varying levels of pressure to flywheel 406. As such, when bicycle 400 interfaces with computer system 102, bicycle 400 can modify the resistance on pedals 410 based on commands received from computer system 102. In addition, bicycle 400 includes incline adjustment 402 which can change the overall incline of bicycle 400. As such, bicycle 400 can also modify its inclination based on commands received from computer system 102. In addition, bicycle 400 can include display 408 for presenting educational content, speakers, microphones, biometric sensors, etc.

Using treadmill 300, bicycle 400, or another type of exercise device 106, educational content may be adapted to simulate a real world environment, such as a trail, route, course, path, or the like. By way of non-limiting example, the educational content may be adapted to simulate a tour of a historical site, such as the pyramids of Giza, the Roman Colosseum, the Battle Road between Lexington and Concord, etc. Thus, concurrent with display and/or audio content being presented using input/output component 102f, education component 102a can cause exercise device 106 to provide physical feedback or physical challenges to user 108. More specifically, hardware control component 102c can be configured to send one or more control signals to exercise device 106 (e.g., treadmill 300, bicycle 400) to adjust one or more operating parameters of exercise device 106 in a manner that replicates grades, stairs, level surfaces, and the like, encountered in these locations.

For example, in the context of educational content that simulates the Battle Road, display content may include still or moving images of the Battle Road, including buildings, bridges, and landscapes that are seen along the Battle Road. Display content may also include maps, painting, drawings, and the like, relating to the simulated location. The display content may be presented in 2D and/or 3D. Using control signals from hardware control component 102c, the education component 102a can synchronize the display content with operating parameters of exercise device 106. Synchronizing the operating parameters and the display content allows user 108 to view a simulated real-world environment concurrent with encountering physical stimuli and challenges that simulate the viewed real-world environment. For example, as user 108 walks/runs on treadmill 300, or spins on bicycle 400, control signals from hardware control component 102c may cause treadmill 300 or bicycle 400 to simulate the terrain (i.e., hills, etc.) that a person would encounter as he or she walks, runs, or bicycles along the Battle Road.

Similar to the display content, audio content can include typical sounds heard by a person traveling along the Battle Road, including cars, sirens, horns, nature sounds, and the like. Audio content may also provide information about the location being simulated or the images presented in the display content. For example, the audio content may include information typically provided on a tour of the Battle Road. More specifically, the audio content may include historical information about the battles of Lexington and Concord that occurred during the Revolutionary War.

The audio content can be synchronized with the control signals and the display programming so that the sounds and/or information provided by the audio content is related to what user 108 is seeing in the display content and experiencing on exercise device 106. For instance, as user 108 views images and experiences the terrain of the Battle Road, user 108 may also hear sounds typically heard along the simulated and displayed portions of the Battle Road. Additionally, or alternatively, user 108 may be provided with narrative information about the Battle Road, the battles of Lexington and Concord, the Revolutionary War, and the like. While the educational content has been described above in connection with the Battle Road, it will be appreciated that the educational content may simulate (visually or audibly), other real-world environments.

When user 108 experiences educational content such as the Battle Road on exercise device 106, user 108 is more likely to remember that experience than if he or she simply read or heard about the events associated with the Battle Road. This is particularly true when user 108 has reached a learning stress zone, during which time the user 108 is producing increased levels of BDNF and/or other neurotrophic factors. As discussed previously, BDNF and/or other neurotrophic factors can increase cognitive ability, and aide in the formation and retention of memories.

In addition to providing educational content relating to historical sites and events, such as the Battle Road, education component 102a can also provide educational content relating to almost any topic, such as geography, animal science, music, math, etc. By way of example, education component 102a may simulate an African safari experience by causing hardware control component 102c to adjust one or more operating parameters exercise device 106 in a manner that mimics African terrain, while presenting display and audio content relating thereto at input/output component 102f. For example, the display content may include images of the terrain being traversed, along with images of wildlife found in the simulated terrain. Audio content may provide information about the displayed wildlife (e.g., hunting and mating rituals), habitat, and the like.

As indicated previously, educational content may be stored at remote storage 104 and/or at local storage 102d. Educational content may originate from a fitness computer or device manufacturer, from a party under control of computer system 102 (e.g., a gym, a school, an employer, a government agency, etc.), from user 108, or for any other appropriate party (e.g., a book company). As an example of educational content originating from user 108, user 108 may take notes during a class or while studying. The notes may be handwritten (and subsequently converted to digital form, such as through scanning or other imaging), typed on a computing device, or dictated. User 108 may also make a audio recordings that include additional educational information, which may also be considered as notes. User 108 may communicate the notes to computer system 102, by communicating them to remote storage 104 and/or by providing a removable storage device to computer system 102.

Once the notes have been provided to computer system 102, education component 102a can present the notes as educational content in visual and/or audio form while user 108 is performing in a learning stress zone or level. For example, education component 102a may cause a display device to display the notes and/or education component 102a may cause an audio device to present the recordings. Furthermore, computer system 102 may also convert written or typed notes into a sound recording that is presented at an audio device, so that computer system 102 "reads" the notes to user 108. Conversely, computer system 102 may convert sound recordings into a textual form, which is then displayed to user 108.

In some embodiments, education component 102a presents the notes to user 108 in their complete form. For instance, the display content may include complete pages of the written or typed notes. Likewise, the audio content may include the entire audio recording. In other embodiments, education component 102a may present only portions of the notes to user 108. For example, the display content may include individual lines or sections from the notes. In one particular example, the display content may present a section heading and a bullet point list under the section heading. Alternatively, the display content may present one or two lines from anywhere in the notes. Accordingly, the display content may present information to user 108 in such a way as to convey to user 108 the context of the information, or the display content may present information to user 108 without providing user 108 any context for the information.

Education component 102a may also manipulate the notes so that user 108 is able to readily see or hear the notes during exercise. For example, the display content may present the notes with enlarged visual size, so that user 108 can easily read the notes while running, cycling, etc. Similarly, the audio content may present audio recordings with increased volume, so that user 108 can easily hear the recordings.

As discussed, education component 102a may provide interactivity to immerse user 108a in the educational content. For example, education component 102a may present questions to user 108. The questions may be presented in verbal form, or the questions may be displayed on a display device. Typically, but not necessarily, the questions relate to simulated terrain, displayed information, or verbally presented information. The presentation of questions to user 108 encourages user 108 to closely engage with the educational content.

When education component 102 presents a question to user 108, user 108 may respond via one or more input devices that are associated with input/output component 102f. For example, user 108 may input a response though touch using one or more of a button, a touch screen, a touch pad, etc. The user may also input a response verbally though use of a microphone. For example, after education component 102a presents educational information about the Battle Road, education component 102a may pose a related question to user 108, such as, "Who travelled along Battle Road into Lexington on the morning of April 19th, 1775?" User 108 may be given several possible answer choices, such as: A) Massachusetts militiamen; B) Paul Revere; C) British Regulars; or D) George Washington. User 108 may be enabled to input his or her answer by touch, or verbally.

Once user 108 has answered a question, education component 102a can indicate to the user, via an audible or visual response, whether or not the answer was correct. In addition, education component 102a may alter a workout program or educational content based on user response. For example, if user 108 answers several questions correctly or incorrectly, education component 102a may cause hardware control component 102c to adjust operating parameters of exercise device 106 (e.g. to increase or decrease the difficulty level of the exercise). Additionally or alternatively, education component 102a may adjust the difficulty level of educational information that is being provided, or the difficulty level of the questions that are being presented.

In some embodiments, education component 102a may prompt user 108 to select different options during presentation of educational content. For example, as user 108 travels along a simulated route, user 108 may be prompted to decide whether to turn left or right at a displayed intersection. User 108 may select the desired option through an input device that is associated with input/output component 102f. By allowing user 108 to select various educational paths, user 108 is able to explore areas, subjects, and the like that are of particular interest to user 108.

In some embodiments, educational content can be theme based. Some themes may be based on educational subjects (e.g., history, geography, etc.). Other themes may include comedy, tragedy, somber, serious, religious, patriotic, fast or slow paced, etc. The manner in which educational content is presented may be shaped by a chosen theme. For example, educational content that that simulates a tour through Washington D.C. may be presented using different themes. A first theme may be patriotic, and the tour may be presented in a manner that is designed to foster a sense of patriotism and love of country. For example, a patriotic tour may include patriotic music, and/or may be narrated by a soldier, a well-known public official, a politician, etc. A second theme may be comedic, and a comedian may narrate the tour and present educational information in a light-hearted or funny manner. For example, the comedian may point out or identify humorous things that are being visually presented.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The present disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

INDUSTRIAL APPLICABILITY

In general, embodiments of the present disclosure relate to exercise systems that enhance learning and memory by presenting educational content to a user while the user is experiencing a stress level that enhances learning and memory formation/retention. For example, embodiments of the present disclosure may detect when the user is experiencing a stress level in which the user may be producing increased levels of BDNF or other neurotrophic factors. Then, embodiments of the present disclosure may present educational content to the user while the user is producing increased levels of BDNF or other neurotrophic factors. In addition, embodiments of the present disclosure may present the educational content in an interactive or immersive manner, such as by posing questions, enabling the user to customize the educational experience, simulating real-world terrain, etc.

Embodiments may include a computer system that detects a stress level of the user through biometric data and/or through workout performance data and that presents educational content when the user has achieved a particular stress level or stress zone. Embodiments may also include exercise devices that receive control signals from the computer system, enabling the computer system to control operating parameters (e.g., speed, incline/grade, resistance, etc.) of the exercise devices. As such, a manufacturer may produce computer systems that detect stress levels and that present educational content, the manufacture may produce exercise devices that interface with the computer systems, or the manufacturer may produce exercise devices that incorporate the computer systems. As such, manufacturers can produce compelling exercise systems that both engage users during exercise and that enhance the user's ability to learn.

For example, using systems according to the disclosure herein, a user may use an exercise device to tour and learn about a historical site, such as ancient ruins, battle sites, etc., while the user is physically primed for learning. They user may be immersed in the experience through audio and display content and by physical feedback or challenges presented by the exercise device. As such, the educational experience can become more memorable than simply reading about the historical site in a book or watching a television program about the historical site while the user is in a more sedentary and lower-stress state, as would typically be the case.

In another example, using systems according to the disclosure herein, a user may use an exercise device to review notes, lectures, or other educational material prepared by the user, a school, or an educational company. For example, while the user is in an optimal stress zone that primes the user for learning, an exercise system can present notes to a user visually and/or audibly. Doing so may help the user to retain the notes in memory more readily than if the user was in a more sedentary and lower-stress state.

In addition, systems according to the disclosure herein may immerse the user in an educational experience through input from the user. For example, an educational experience may include questions that review information previously presented to the user, or may allow that user to choose his or own path through the educational material. Doing so actively engages the user's mind and attention, and can further reinforce the user's ability to remember the material presented.

What is claimed is:

1. An exercise system, comprising:
   one or more processors;
   one or more biometric sensor devices;
   a stationary exercise device capable of receiving commands from the one or more processors;
   one or more output devices; and
   one or more computer-readable storage media storing computer executable instructions that, when executed by the one or more processors, cause the following acts:
   at the one or more biometric sensor devices, detecting a stress level of the user during a performance of an exercise with the stationary exercise device;
   based on detecting the user's stress level, determining that the user's stress level is within a stress zone that is suitable for memory retention by the user; and
   based on determining that the user's stress level is within the stress zone, presenting educational content to the user at the one or more output devices.

2. The exercise system of claim 1, wherein the one or more output devices comprise a display device, and wherein the act of presenting educational content to the user comprises an act of presenting educational content at the display device.

3. The exercise system of claim 2, wherein the act of presenting educational content at the display device comprises acts of:
   presenting a simulated navigational path at the display device, the simulated navigational path having a variable grade; and
   controlling an incline level of a stationary exercise device to simulate the variable grade.

4. The exercise system of claim 1, wherein the act of presenting educational content at the display device comprises acts of:
   presenting a simulated navigational path at the display device, the simulated navigational path being traversed at varying speeds; and
   controlling a speed level of a stationary exercise device to simulate the varying speeds.

5. The exercise system of claim 1, wherein the act of presenting educational content at the display device comprises acts of:

presenting a simulated navigational path at the display device, the simulated navigational path having varying difficulty, including one or more of varying speed or varying incline; and controlling a resistance level of a stationary exercise device to simulate the varying difficulty.

6. The exercise system of claim 1, wherein the one or more output devices comprise an audio output device, and wherein the act of presenting educational content to the user comprises presenting educational content at the audio output device.

7. The exercise system of claim 1, wherein the act of detecting the stress level of the user comprises an act of detecting one or more of pulse rate, blood pressure, respiratory rate, body temperature, blood oxygen level, or metabolic rate.

8. The exercise system of claim 1, wherein the act of detecting the stress level of the user comprises an act of detecting one or more of speed, power generation, incline/grade being traversed, resistance of a workout device, or cadence.

9. The exercise system of claim 1, wherein the act of detecting the stress level of the user comprises an act of detecting the user's average pulse rate, averaged over a predefined period of time.

10. The exercise system of claim 1, further comprising the following acts:

based on detecting the user's stress level, determining that the user's stress level is not within the stress zone that is suitable for memory retention; and modifying a workout program to encourage the user to modify the user's level of physical exertion to bring the user's stress level within the stress zone that is suitable for memory retention.

11. The exercise system of claim 10, wherein the act of modifying the workout program to encourage the user to modify the user's level of physical exertion comprises an act of modifying the workout program to encourage the user to increase the user's level of physical exertion.

12. The exercise system of claim 10, wherein the act of modifying the workout program to encourage the user to modify the user's level of physical exertion comprises an act of modifying the workout program to encourage the user to decrease the user's level of physical exertion.

13. The exercise system of claim 10, wherein the act of modifying the workout program comprises an act of modifying one or more parameters of a stationary exercise device.

14. The exercise system of claim 1, wherein the act of modifying the workout program comprises an act of modifying a workout program being presented to the user by a mobile exercise device.

15. The exercise system of claim 1, wherein the act of detecting the user's stress level comprises an act of detecting a pulse rate of the user, and wherein the act of determining that the user's stress level is with the stress zone comprises an act of determining that the user's pulse rate is within a predefined range.

16. A method for stimulating learning and memory, the method implemented at a computer system that includes one or more processors, one or more biometric sensor devices, and one or more output devices, the method comprising:

at the one or more biometric sensor devices, an act of the computer system detecting a stress level of the user, including detecting at least a pulse rate of the user;

based on detecting the user's stress level, an act of the computer system determining that the user's stress level is within a stress zone that is suitable for memory retention by the user, including determining that the user's pulse rate is within a predefined range; and based on determining that the user's stress level is within the stress zone, an act of the computer system presenting educational content to the user at the one or more output devices.

17. The method as recited in claim 16, further comprising an act of the computer system modifying one or more parameters of an exercise device to simulate the user traversing a path corresponding to the educational content.

18. The method as recited in claim 16, wherein the act of presenting educational content to the user at the one or more output devices comprises an act of presenting educational content at a display device.

19. The method as recited in claim 16, wherein the act of presenting educational content to the user at the one or more output devices comprises an act of presenting educational content at an audio device.

20. A computer program product comprising one or more physical computer-readable storage media having stored thereon computer-executable instructions that, when executed by one or more processors of a computer system, cause the computer system to implement a method for stimulating learning and memory, including the following:

at one or more biometric sensor devices, detecting a stress level of the user, including detecting at least a pulse rate of the user;

based on detecting the user's stress level, determining that the user's stress level is within a stress zone that is suitable for memory retention by the user, including determining that the user's pulse rate is within a predefined range; and based on determining that the user's stress level is within the stress zone, presenting educational content to the user at one or more output devices.

* * * * *